April 25, 1967  I. V. K. HOTT ET AL  3,315,571
JACKING UNIT AND METERING VALVE THEREFOR
Filed March 25, 1965  2 Sheets-Sheet 1

INVENTORS
ION V. K. HOTT
ROBERT J. HADDIX
BY
*Dybvig & Dybvig*
THEIR ATTORNEYS

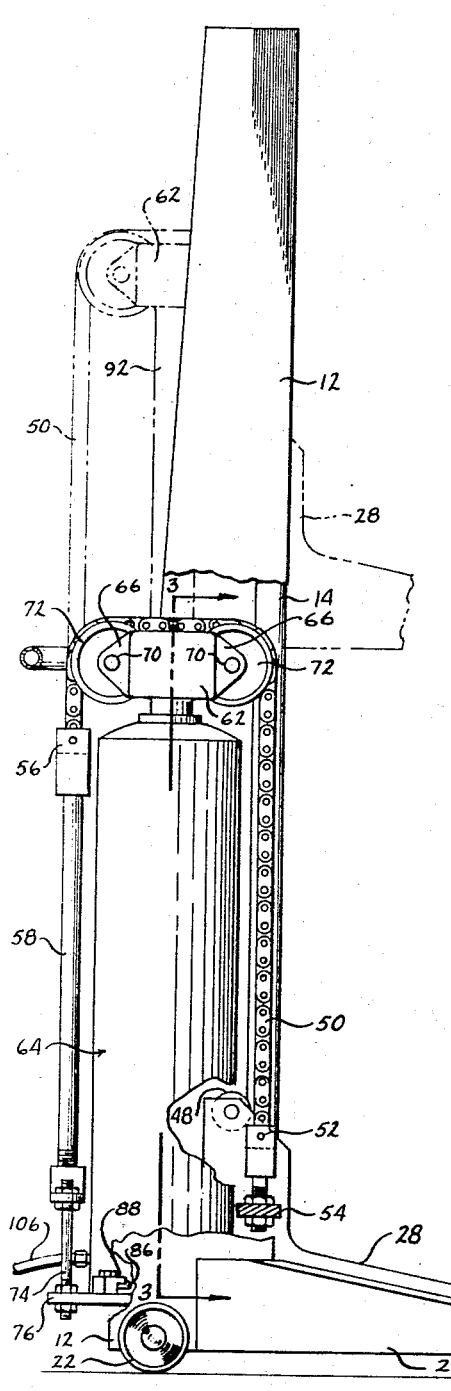
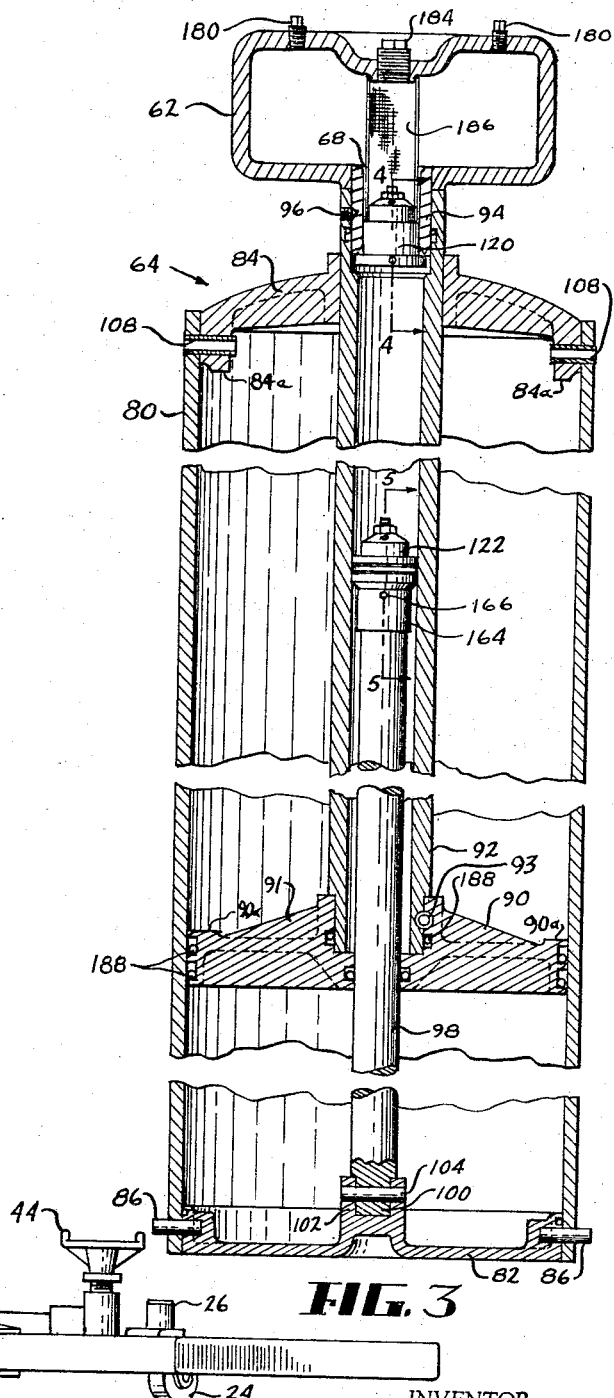
FIG. 2
FIG. 3
INVENTOR
ION V. K. HOTT
ROBERT J. HADDIX
BY
*Dybvig & Dybvig*
THEIR ATTORNEYS

United States Patent Office 3,315,571
Patented Apr. 25, 1967

3,315,571
JACKING UNIT AND METERING VALVE
THEREFOR
Ion V. K. Hott and Robert J. Haddix, Dayton, Ohio, assignors of one-third to said Hott, one-third to C. Huston Brown, and one-third to Warren E. Webster, all of Dayton, Ohio
Filed Mar. 25, 1965, Ser. No. 442,629
7 Claims. (Cl. 92—8)

This invention relates to a jack and more particularly to a jacking unit adapted for use in a "high rise" vehicle lifting jack of the type adapted to elevate a motor vehicle above the ground or other working surface so that repairs or maintenance may conveniently be accomplished on the vehicle. As will become apparent however, the invention is not necessarily so limited.

An object of this invention is the provision of a novel motor vehicle jack.

A further object of this invention is the provision of a hydraulically controlled, air operated jacking unit of simple but reliable construction.

A further object of this invention is the provision of novel fluid pressure responsive valve constructions adapted to meter liquid flow therethrough.

Other objects and advantages will become more apparent from the following description.

Referring to the drawings:

FIGURE 2 is a side elevational view, with portions broken away and in cross-section, of the jack shown in FIGURE 1.

FIGURE 3 is a cross-sectional view, taken along line 3—3 of FIGURE 2, of a jacking unit used in the jack of FIGURES 1 and 2.

Figures 1, 4, 5:
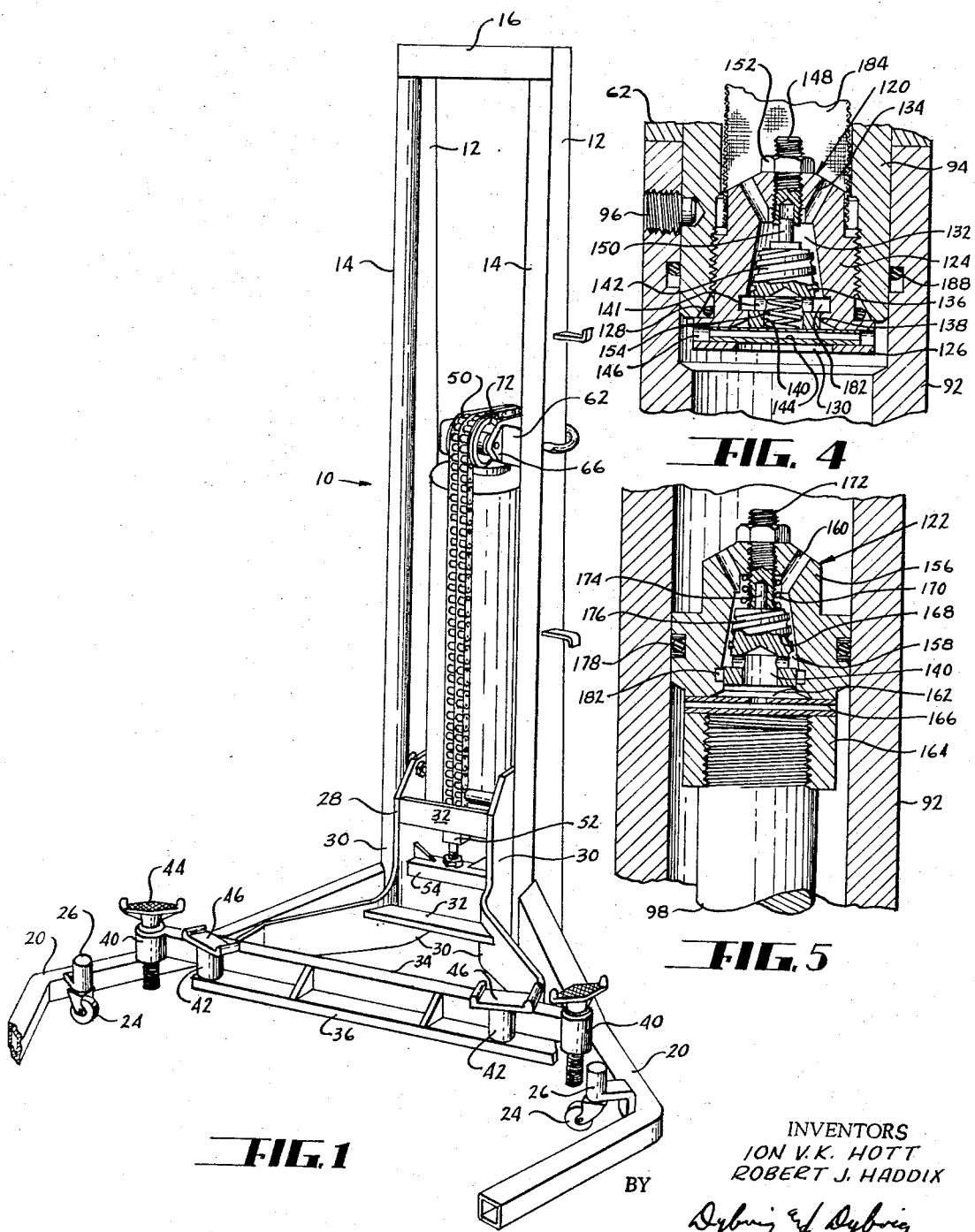
FIGURE 1 is a perspective view of a "high rise" vehicle jack made in accordance with this invention.
FIGURE 4 is a cross-sectional view of a portion of the jacking unit, taken along the lines 4—4 of FIGURE 3, and particularly illustrating a valve employed therein.
FIGURE 5 is a cross-sectional view of another portion of the jacking unit, taken along line 5—5 of FIGURE 3, and particularly showing another valve employed therein.

Referring in greater detail to FIGURES 1 and 2, a motor vehicle jack made in accordance with this invention includes a chassis 10 formed from a pair of parallel, spaced, vertical support members or stanchions 12 including vertically disposed track forming members 14. In the embodiment shown in the drawings, the track members 14 are cylindrical posts. The upper ends of the stanchions 12 are connected by a top plate or brace 16. A pair of legs 20 diverge outwardly from the lower ends of the stanchions 12.

The chassis 10 is supported by a pair of rear wheels 22, one connected to the bottom of each stanchion 12, and forward wheels or castors 24 mounted in spring housings 26 connected to the legs 20. The legs 20 are normally supported off the ground as illustrated in FIGURE 2 by springs (not shown) within the spring housings 26. When a load is supported by the jack, the spring bias is overcome and the legs 20 engage the ground. The span of the legs 20 is sufficient to maintain the jack in a stable position when lifting a load. If desired, the jack can be moved about upon the wheels 22 and 24 or the jack could be affixed in position in any suitable manner.

Although the height of the stanchions 12 can be made to suit the desires of the user, the jack shown in the drawings is intended to be a "high rise" jack which may be used in association with another jack to lift an entire vehicle above the ground to a height of sixty inches or more.

The jack further includes a vehicle lifting carriage 28 having two carriage side plates 30 interconnected by braces 32. A cross bar 34 is connected, as by welding, to the forward ends of the carriage side plates 30 and a cross plate 36 is similarly connected to the bottom of the cross bar 34. Attached to the extreme ends of the cross bar are hollow, cylindrical saddle supports 40. Similar hollow saddle supports 42 are also mounted on the top face of the cross plates 36. Show mounted on the saddle supports 40 are load engaging saddles 44 having threads which engage internal threads in the saddle supports 40, enabling the height of the saddles 44 to be adjusted. Somewhat similar saddles 46 are shown supported in the saddle supports 42. The saddles 46 include pins (not shown) projecting in the saddle supports 42 permitting them to swivel. As well known, the saddles 44 and 46 are adapted to engage the frames or other underbody portions of the vehicles to be raised.

The carriage 28 is guided along the track forming members 14 in a conventional manner by roller elements 48 pinned to the carriage side plates 30 and engaging the front and rear sides of the members 14. To raise and lower the carriage 28, a flexible convertor or motion transmitting element, such as a chain 50, is connected by a fixture 52 to a carriage beam 54 attached to and extending between the carriage side plates 30. The chain 50 is connected at its other end to a fixture 56 mounted on the top of a connecting rod 58. Intermediate its ends, the chain 50 engages a pair of pulley or idler wheels 72 mounted on axles 70 which in turn are supported by pairs of forwardly and rearwardly projecting flange portions 66 of a housing 62. The bottom of the rod 58 is mounted by a fixture 74 upon a jack base plate 76, which is welded or otherwise connected to the support stanchions 12.

Referring to FIGURE 3, the jacking unit 64 comprises a hollow cylinder 80 having a cylinder base plate 82 and a cylinder cover plate 84. A plurality of mounting pins 86 project through the lower wall portion of the cylinder 80 into an upwardly extending annular flange portion of the base plate 82. As shown in FIGURE 2, the cylinder 80 is adapted to rest on the jack base plate 76 and is clamped in a fixed position between the stanchions 12 by clamping members 88 overlying the pins 86 and bolted to the plate 76. The interior of the cylinder 80 is separated into two compartments or chambers by a piston 90 having an external diameter substantially equal to the internal diameter of the cylinder 80 and which, as illustrated in FIGURE 3, may comprise a flanged plate having strengthening webs 91. Connected to the piston 90, as by a pin 93, is a hollow cylindrical member or piston rod 92 projecting through the upper compartment of the cylinder 80 and through the cylinder cover plate 84. The aforementioned housing 62 has a central aperture 68 in the lower surface thereof. A sleeve 94 connected to or integral with the housing 62 encircles the aperture 68 and serves as a lining for an enlarged internal diameter portion of the hollow piston rod 92. The sleeve 94 is connected to the piston rod 92 in any suitable manner, as by a set screw 96.

The piston 90 is guided for vertical travel within the cylinder 80 by a valve support rod 98 projecting through a central aperture in the piston 90 and through a considerable portion of the cavity formed in the center of the hollow piston rod 92. The lower end of the support rod 98 has a reduced diameter, as shown at 100, and is received within an annular socket 102 formed in the center of the cylinder base plate 82 and pinned in the socket 102 by a connecting pin 104. To avoid binding of the piston 90 and the piston rod 92 against the support rod 98, the fit between the pin 104 and the socket 102 and also the fit between the portion 100 and the socket 102 is loose, whereby the rod 98 is permitted slight freedom of movement about its vertical axis.

The operation of the apparatus as thus far described is as follows. Air under pressure from any suitable source (not shown) is introduced by an air hose 106 (FIGURE 2) into the lower compartment in the cylinder 80 through a combined air intake and exhaust port (not shown) in the lower end of the cylinder 80. The air under pressure forces the piston 90 upwardly. Consequently, the piston rod 92 and the housing 62 raise from that position shown in full lines in FIGURE 2 to that shown in dotted lines in FIGURE 2, thus raising the carriage 28 and the load supported thereby. The upper limit of travel of the carriage 28 is determined by cooperating stop surfaces 90a and 84a on the piston 90 and the cylinder cover plate 84 respectively. Also, any of a variety of external control or stop members could be used. Such members are well known and none is disclosed herein. Also a suitable safety latch can be incorporated into the jack for maintaining the carriage 28 in selected positions. Again, a variety of safety latches have been used in jacks in the past and none is disclosed herein.

When it is desired to lower the carriage 28, the air within the lower compartment of the cylinder 80 is exhausted to atmosphere through the air hose 106. The air flow can be controlled by a conventional external air control valve (not shown). The weight of the carriage 28 and the load supported thereby, along with the weight of the piston 90, the piston rod 92 and the housing 62, are sufficient to cause the carriage to lower. As is apparent, the volume of the upper compartment of the cylinder 80 changes while the piston 90 moves up or down. To avoid unwanted pressure changes therein, the upper compartment is relieved to atmosphere by two or more relief tubes 108.

While jacking units designed along the lines of the apparatus as thus far described may be used, the operation of such air operated jacking units is not entirely satisfactory, since air operated units tend to be somewhat erratic in operation and since a column of air, being compressible, will not adequately support a vehicle without "creeping" of the lift carriage. Upon exhausting the compressed air through the tube 106, the carriage 28 would tend to fall rapidly due to the rapid release of pressure within the lower compartment in the cylinder 80. When used for high rise jacks, the erratic operation of the air operated jacking unit could lead to especially dangerous conditions. In accordance with this invention, the movement of the piston 90 within the cylinder 80 and, accordingly, the movement of the carriage 28 is controlled by a hydraulic system incorporated in the jacking unit. As will be described immediately below, the hydraulic system serves to dampen the movement of the piston 90, both when traveling upwardly and when traveling downwardly.

Referring to FIGURES 3, 4 and 5, the hydraulic system is incorporated in the hollow piston rod 92 and the housing 62 constitutes a liquid reservoir. The piston rod 92 is constantly filled with oil or other suitable liquid. The dampening action is accomplished by adjustable metering valves located at spaced intervals in the piston rod 92, and limiting liquid flow therethrough, there being an upper metering valve 120 and a lower metering valve 122.

As shown best in FIGURE 4, the upper metering valve 120 comprises a generally cylindrical valve body 124 threadedly secured in the lower end of the lining sleeve 94. The base of the valve body 124 is provided with an an enlarged annular flange 126 abutting the bottom of the sleeve 94. A sealing ring 128 between the flange 126 and the sleve 94 insures that no liquid can pass from the cavity within the piston rod 92 around the valve body 124 into the reservoir housing 62. Liquid can, however, pass in either direction through the valve body 124. Liquid passes from the lower end of the valve 120 to its upper end through a central opening 130 in the base of the valve body 124, a centrally located, internal valve cavity 132, and a plurality of liquid passageways 134 in the upper end of the valve body 124. The same path is followed when liquid passes from the upper end of the valve 120 to its lower end.

The free flow of liquid through the inter-communicating central opening 130, cavity 132 and passageways 134 is inhibited by a valve element 136 located in the cavity 132. The valve element 136 has a circular base substantially coextensive with and filling a circular passageway 138 communicating between the central opening 130 and the cavity 132. The base of the valve element 136 is, therefore, provided with a central bore 140. A plurality of passageways 141, communicating between the bore 140 and the cavity 132 permit free flow of liquid therebetween. The remainder of the valve element 136 is solid and generally conical, but has a continuous spiral groove 142 cut in its exterior surface. The conical exterior surface of the valve element 136 substantially matches the conical inner surface of the valve body 124 defining the cavity 132. Accordingly, if the valve element 136 could be raised from that position shown in FIGURE 4 to a position wherein the conical exterior surface of the valve element 136 engages the surface defining the cavity 132, the flow of liquid through the valve 120 would be limited to the liquid flow along the spiral groove 142.

As will be described in detail below, the valve element 136 is automatically raised and lowered relative to the valve body 124 in response to pressure changes within the piston rod 92. Downward movement of the element 136 is limited by a roll pin or the like 144 extending across the opening 130 and located in opposed apertures 146 in the base of the valve body 124. Upward movement of the valve element 136 is limited by an adjustable stop comprising a stop pin 148 threadedly adjustably mounted in a bore at the top of the valve body 124, and having a bored lower end slidably receiving a guide pin 150 affixed to the top of the valve element 136. The stop pin 148 may be locked in a fixed position relative to the valve body 124 by a nut 152. For many applications, the stop pin 148 is so adjusted that the outer conical surface of the valve element 136 cannot engage the surface of the cavity 132; hence, slightly more liquid can flow through the cavity 132 than would be possible were the liquid flow restricted to the groove 142. The adjustable stop provided by the stop pin 148 and the guide pin 150, aided by the confinement of the base of the valve element 136 in the circular passageway 138, guides the valve element 136 during its vertical travel. For reasons which will appear below, a coil spring 154 located within the bore 140 of the valve element 136 and supported on the roll pin 144 biases the element 136 to its uppermost position. As will also appear below, the valve element 136 shown in FIGURE 4 is lowered against the bias of the coil spring 154 as a result of a reduction in pressure immediately therebeneath present when the piston 90 is rising.

Referring to FIGURE 5, the lower metering valve 122 is quite similar in construction to the upper valve 120. The lower valve 122 includes a valve body 156 having a central valve cavity 158, upper passageways 160 and a central opening 162 in its base. In this case, a sleeve portion 164 surrounds the central opening 162 and has internal screw threads engaging external threads on the upper end of the support rod 98. Liquid can flow from the lower end of the cavity in the piston rod 92 through a spring roll pin 166 in the base of the body 156 and through other passageways (not shown) bored through the base of the valve body 156.

The lower metering valve 122 has a valve element 168 which may be identical to the element 136 of the upper valve 120. The lower valve element 168 serves the same function as the upper valve element 136. However, the lower valve element 168 is biased to its lowermost position against the roll pin 166 by a coil spring 170 encircling an adjustable stop pin 172. Thus, in FIGURE 5, the lower valve element 168 is illustrated in its uppermost position, the bias of the coil spring 170 being overcome by liquid pressure within the hollow piston rod 92. As in the case of the upper valve 120, the stop pin 172 is located in the top center of the valve body 156 and cooperates with a guide pin 174 projecting upwardly from the top of the valve element 168 to guide the movement of the valve element 168 and to limit its upward travel. As shown in FIGURE 5, the stop pin 172 has been adjusted to provide a gap between the valve surface of the valve element 168 and the cooperating valve surface of the valve cavity 158 to permit a greater minimum liquid flow than would be permitted by a spiral groove 176 cut in the conical outer surface of the valve element 168. To prevent liquid from flowing around the lower valve 122, the diameter of the midportion of the lower valve body 156 is substantially the same as the internal diameter of the piston rod 92, and a heavy duty sealing ring 178 is located in a groove therein.

The hydraulic dampening system operates as follows. Upon introduction of air under pressure into the lower chamber of the cylinder 80, the lower cavity portion of the piston rod 92 beneath the lower metering valve 122 contracts while the cavity portion of the piston rod 92 between the two metering valves 120 and 122 expands. The contraction of the lower cavity portion causes liquid to be forced through the lower metering valve 122 into the cavity portion between the valves 120 and 122. The liquid pressure created in the lower cavity forces the lower valve element 168 upwardly against the bias of the coil spring 170 into that position shown in FIGURE 5. Consequently, the restricted liquid flow through the lower valve 122 limits the upward travel speed of the piston rod 92 and accordingly, the carriage 28. At the same time, there is a low pressure area in the piston rod 92 immediately beneath the upper valve 120 caused by the expansion of the cavity portion between the two valves 120 and 122. To avoid drawing a vacuum in the piston rod 92 or in the reservoir housing 62, a pair of relief ports 180 at the top of the housing establish ambient atmospheric pressure at the top of the reservoir. The considerable pressure differential between the top of the reservoir and the cavity portion immediately beneath the upper valve 122 forces the upper valve element 136 downwardly against the bias of the coil spring 154. Accordingly, while the piston 90 rises, liquid flows freely from the reservoir through the upper valve 120 into the cavity portion therebelow.

As noted above, the lower metering valve 122 restricts the liquid flow relative thereto, and accordingly, the speed of travel of the piston 92 and carriage 28 during their upward movement. The upper metering valve 120 similarly restricts the carriage speed when the air under pressure is exhausted from the lower chamber of the cylinder 80 to permit the carriage 28 to move downwardly from an elevated position. This occurs as follows. The high pressure resulting from contraction of the cavity portion of the piston rod 92 between the valves 120 and 122 aids both coil springs 154 and 170. Therefore, the lower valve 122 is fully "open" while the upper valve element 136 is substantially "closed," that is, substantially restricting the flow of liquid through the upper valve 120. The liquid thus flows freely through the lower valve 122 into the expanding cavity portion therebelow. On the other hand, the restricted liquid flow through the upper valve 120 dampens the movement of the piston 92, thereby dampening the lowering of the carriage 28.

The pressure differences described above are considerable. When the liquid flows downwardly relative to either of the valve elements 136 or 168 into the passageways communicating with the central bores 140 therein, the liquid flow along the spiral grooves could cause the element 136 or 168 to spin about its vertical axis, creating undesirable noise and undue wear on the parts. For this reason, an annular groove 182 is formed in both valve bodies 124 and 156 immediately beneath the valve cavities 132 and 158 therein. The liquid flowing downwardly along the valve elements 136 and 168 swirls around the grooves 182 before entering the bores 140. Unwanted spinning of the valve elements 136 and 168 is thus avoided.

Liquid can be introduced into the reservoir housing 62 through a central fill port 184. The housing 62 at all times contains an adequate supply of liquid to completely fill the hollow piston rod 92, even when the piston 90 is in its uppermost position. Foreign matter can be filtered from the piston rod 92 by a cylindrical screen 186 surrounding the upper end of the upper valve 120 and extending to the top of the reservoir. Various sealing rings designated 188, are placed between the piston 90 and the cylinder 80, and between the several parts thereof to insure a fluid tight assembly.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention we claim:

1. A jacking unit comprising: an air cylinder having an internal cavity, a piston slidably mounted within said cylinder, said piston separating said internal cavity into two chambers, an air intake and exhaust port located in one of said chambers and means for introducing air under pressure into said one of said chambers, the other of said chambers being relieved to ambient atmosphere, a hollow piston rod connected to said piston and extending through an end wall of said cylinder, said piston rod being filled with a liquid, and metering valve means within said piston rod limiting the flow of said liquid within said piston rod as the air pressure within said one of said chambers is increased or decreased to move said piston relative to said cylinder, said metering valve means including a first metering valve housed in and supported by said piston rod and a second metering valve housed in said piston rod and supported by said cylinder, each of said valves having a valve element occupying a substantially open position permitting a relatively high flow of liquid through the valves and a substantially closed position permitting a relatively small flow of liquid through the valves, bias means biasing one of said valve elements into its substantially closed position, bias means biasing the other of said valve elements into its substantially open position, both of said valve elements being movable in response to liquid pressure within said piston rod to restrict the movement of said piston.

2. A jacking unit comprising: an air cylinder having an internal cavity, a piston slidably mounted within said cylinder, said piston separating said internal cavity into two chambers, an air intake and exhaust port located in one of said chambers and means for introducing air under pressure into said one of said chambers, the other of said chambers being relieved to ambient atmosphere, a hollow piston rod connected to said piston and extending through an end wall of said cylinder, said piston rod being filled with a liquid, and metering valve means within said piston rod limiting the flow of said liquid within said piston rod as the air pressure within said one of said chambers is increased or decreased to move said piston relative to said cylinder, said metering valve means including a metering valve comprising a valve body having a generally conical cavity therein, a generally conical valve element slidably received within said valve body, said valve element having a spiral groove along its conical outer surface, and bias means biasing said valve element to an end position within said cavity.

3. The structure of claim 2 wherein said bias means biases said valve element into a position wherein said conical outer surface engages or nearly engages the inner surface of said cavity and the flow of liquid through said metering valve is limited by the flow capacity of said spiral groove.

4. The structure of claim 2 wherein said bias means biases said valve element into a position wherein said conical outer surface is spaced from the inner surface of said cavity and liquid may flow freely through said valve between said surfaces, said valve element moving against said bias in response to oil under pressure acting upon said valve element whereupon the flow of liquid through said metering valve is substantially limited to the flow capacity of said spiral groove.

5. In a jacking unit, a cylinder, a piston slidably movable internally of said cylinder and separating said cylinder into two chambers, means for introducing and removing air under pressure into and from one of said chambers to move said piston within said cylinder, a hollow cylindrical member mounted on said piston and movable therewith, a liquid reservoir connected to said cylindrical member and having an opening communicating with the interior of said hollow cylindrical member, a first metering valve inside of said hollow cylindrical member and supported in fixed spaced relation to said piston, a second metering valve inside of said hollow cylindrical member and supported in fixed spaced relation to said cylinder, said metering valves separating the interior of said hollow cylindrical member into a pair of internal cavity portions, one cavity portion being located between said first and second metering valves and the other cavity portion being located between said second metering valve and said piston, both of said metering valves including valve elements responsive to liquid pressure changes in said hollow cylindrical member created by contraction and expansion of said cavity portions as said piston moves relative to said cylinder.

6. In a fluid metering valve, a valve body having an internal valve cavity, a valve element movable in said valve cavity, said valve element having a surface portion movable toward and away from a cooperating surface portion of said valve cavity, one of said surface portions having a groove therein permitting a minimum fluid flow between said valve body and said valve element regardless of the separation therebetween, and adjustable stop means mounted in said valve body and engageable with said valve element limiting the advancement of said surface portion of said valve element toward said cooperating surface portion of said valve body.

7. The structure of claim 6 wherein said cavity and said valve element are generally conical, said groove constituting a spiral groove along the generally conical outer surface of said valve element.

References Cited by the Examiner

UNITED STATES PATENTS

| | | | |
|---|---|---|---|
| 582,092 | 4/1897 | Ridgway | 92—12 |
| 2,081,921 | 6/1937 | Gartin | 92—9 |
| 2,122,080 | 6/1938 | Wisdom | 138—46 |
| 2,311,381 | 2/1943 | Green | 138—46 |
| 2,517,154 | 8/1950 | Wolf | 138—43 |
| 2,658,528 | 11/1953 | Ifield | 138—43 |
| 2,909,358 | 10/1959 | Southerwick | 254—2 |
| 2,974,490 | 3/1961 | Hott | 254—2 XR |
| 3,182,959 | 5/1965 | Hemmeter | 254—93 |

WILLIAM FELDMAN, *Primary Examiner.*

MILTON S. MEHR, *Examiner.*